Patented Nov. 8, 1932

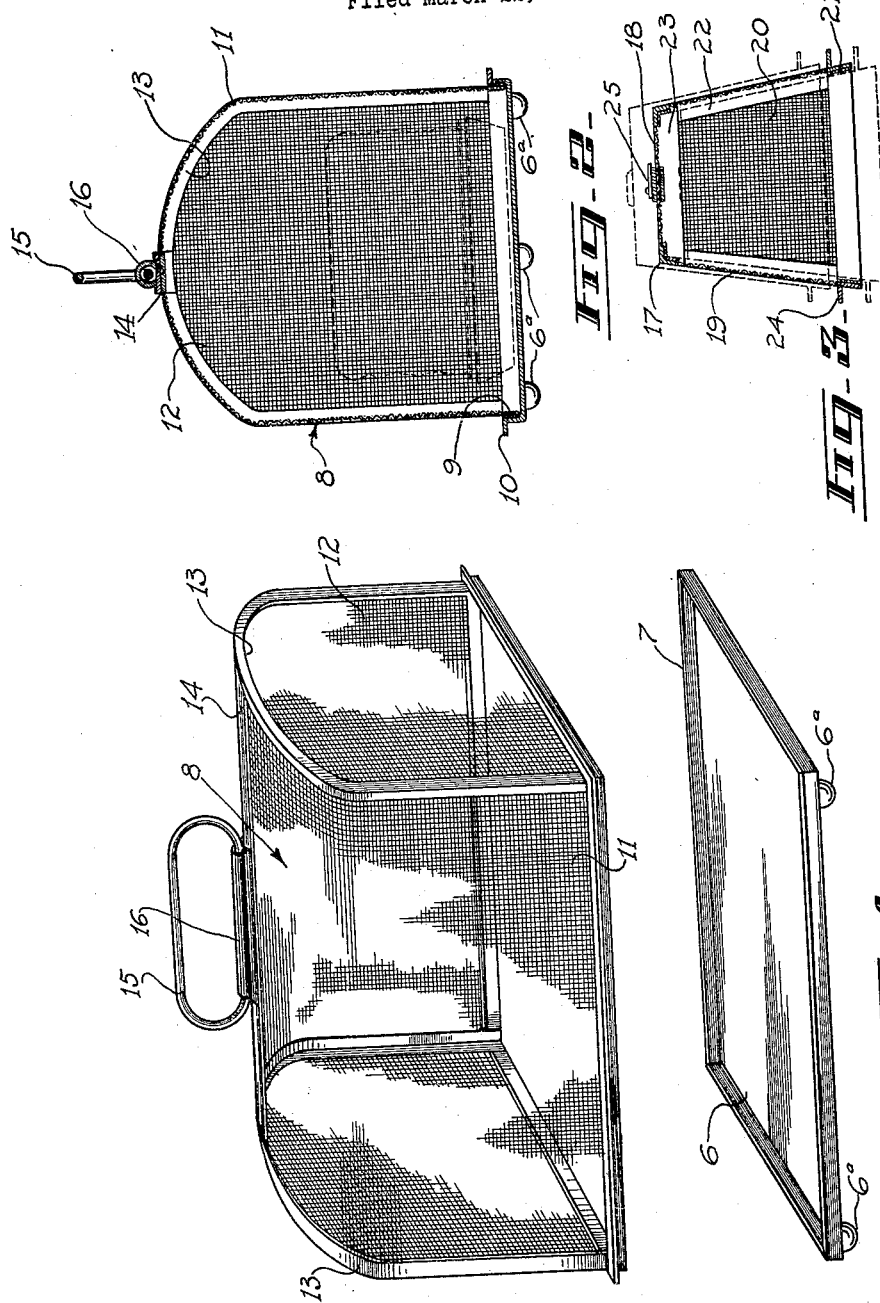

1,886,711

UNITED STATES PATENT OFFICE

IDA MAE McLEOD, OF HOBBEMA, ALBERTA, CANADA

SANITARY FOOD PROTECTOR

Application filed March 22, 1929. Serial No. 349,040.

This present invention relates to new and useful improvements in a sanitary food protector and has for its primary object the provision of a protector especially designed for cakes, pies and the like while cooling the same.

Another object of the invention resides in the provision of a sanitary food protector which will permit free circulation of air therethrough and at the same time protect the food located therein.

A further object of the invention resides in the provision of a sanitary food protector of the character stated in which the body consists of a rigid frame covered with reticulated material forming sides and ends and the frame constructed so as to fit firmly on the tray provided therefor so as to prevent flies, insects and the like from passing under the edge of the body and thus reaching the food resting on the tray and covered over by the said body.

A still further object of the invention resides in the provision of a sanitary food protector of the character stated which is of firm and substantial construction as well as highly efficient in use and composed of the minimum number of parts.

To the accomplishment of these and related objects as shall become apparent as the description proceeds, my invention resides in the construction, combination and arrangement of parts as shall be hereinafter more fully described, illustrated in the accompanying drawings, and pointed out in the claims hereunto appended.

The invention will be best understood and can be more clearly described when reference is had to the drawing forming a part of this disclosure, wherein like characters indicate like parts throughout the several views.

In the drawing:—

Figure 1 is a perspective view of the sanitary food protector with the body thereof raised above the tray;

Figure 2 is a transverse vertical section through the sanitary food protector with the body in position on the tray and indicating in dotted lines a cake protected therein and Figure 3 is a transverse vertical section through the body shown in modified form and illustrating by dotted lines the manner in which a number of the bodies may be nested for storage and shipping purposes.

Referring more in detail to the drawing, it will be noted that the sanitary food protector includes a tray 6 of rectangular construction and provided with an upstanding flange 7 around it entire edge, while feet 8 or other projections are provided on the under side of the tray to raise the same from the permanent support on which the sanitary food protector is placed.

The body 8 of the food protector includes a rectangular frame 9 which is adapted to fit snugly within the tray 6 against the inner face of the flange 7 thereof, with the outturned outer edge 10 of the frame 9 extended outwardly over the flange 7, thus making it impossible for flies, insects or the like to pass under the edge of the body frame 9. This body frame 9 is preferably constructed from a metallic strip bent centrally upon itself to channel form and has secured therein the lower edges of a screen section 11 forming the sides and top of the body 8. The lower edges of the end screen section 12 of the body 8 are also secured in the body frame 9. Substantially inverted U-shaped frames 13, are also included in the body structure to connect the opposed edges of the screen section 11 and the end screen sections 12. The central portions of the end frames 13 of the body structure are connected by a pair of longitudinal strips 14 extended therebetween with one of the strips 14 on the outer face and the other on the inner or under face of the screen section 11 and firmly united thereto and to one another, in an appropriate manner. A light handle 15, formed of wire or the like is supported on the top of the body 8 by a mounting plate 16 secured on the upper strip 14 or by other suitable means, so that the body 8 may be readily lifted off of and placed upon the tray 6, as desired, without interfering with the food on the tray 6.

In the modified form of the invention, shown in Figure 3, the body 17 is shown as having a flat top 18 and downwardly flared sides 19 and ends 20, so that a number of bodies 17 may be nested on one another for storage and shipping purposes. The top 18, sides 19 and ends 20 are formed of a screen mesh or other reticulated material and a pair of inner and outer metallic strips 21 are secured around the lower edge of the sides 19 and ends 20 to enclose and reinforce the same. Upstanding side strips 22 are also provided on the inner and outer faces of the sides 19 and ends 20 where they connect, for similar purposes. The upper edge of the body 17 is similarly reinforced and strengthened by inner and outer metallic strips 23 secured on the inner and outer faces of the sides 19 and ends 20 and also on the body top 18 at the connection of the latter with said sides 19 and ends 20. The strips 22 and 23 are each of angular form in cross section. It will therefore be seen that the modified form of body 19 is thoroughly strengthened at all corners and edges thereof and danger of the body being pressed out of shape in ordinary use or being transported, is reduced to the minimum. In this form as well as in the preferred form, an out-turned annular flange 24 is provided on the outer strip 21 so as to form a tight closure over the upstanding flanges 7 of a tray 6 or the like and prevent passage of insects, dust, etc., under the edge of the body 17 when the food protector is in use. A handle structure 25 is also preferably provided on the top 18 of the body 17 and may be readily turned down to prevent interference of nesting of two or more of the bodies 17 on one another.

As the construction of the device has thus been described in detail, brief reference is now had to its use and modus operandi: The body 8 may be readily moved vertically to position over the food on the tray 6 or in a similar manner removed, without danger of striking or injuring the food, this is of importance when the food is in the form of a freshly iced cake, soft top pie or the like. Furthermore, when the body 8 is in position on the tray 6, it is firmly held in position thereon without leaving any space between the lower edge of the body 8 and the tray 6. Owing to the construction of the body 8, the air currents may freely pass therethrough in any direction and thus cause a rapid cooling of the food and thorough airing thereof while at the same time thoroughly protecting all of the food on the tray 6 and surrounded by the body 8. The weight of the body 8 is sufficient together with its snug fitting on the tray 6, to assure retention of the body 8 in position without danger of it being blown away or accidentally moved on the tray 6.

From the foregoing description taken in connection with the accompanying drawing, it will be manifest that a sanitary food protector is provided that will fulfil all the necessary requirements of such a device, but as many changes could be made in the above description and many apparently widely different embodiments of my invention may be constructed within the scope of the appended claim without departing from the spirit or scope thereof, it is intended that all matters contained in its said accompanying specification and drawing shall be interpreted as illustrative and not in a limited sense.

Having thus described my invention, what I claim as new and desire to secure by Letters Patent is:—

A sanitary food protector including a tray of rectangular form provided with an upstanding annular flange; a body including a lower frame of corresponding form for snug engagement on said tray and contact with the inner face of the flange thereof; said lower frame having its outer edge extended outwardly for engagement over the flange of said tray; said body including end frames extended upwardly from said lower frame; rigid connections between the upper portions of said end frames; screen members secured on the frame of said body to form the sides and top as well as the ends thereof; and a handle carried on the connection between said end frames.

In testimony whereof I hereunto affix my signature.

IDA MAE McLEOD.